US008296581B2

(12) United States Patent
Jennings et al.

(10) Patent No.: US 8,296,581 B2
(45) Date of Patent: Oct. 23, 2012

(54) SECURE PROCESSOR ARRANGEMENT HAVING SHARED MEMORY

(75) Inventors: Gerard David Jennings, Munich (DE); Eckhard Delfs, Nuremberg (DE)

(73) Assignee: Infineon Technologies AG (DE)

( * ) Notice: Subject to any disclaimer, the term of this patent is extended or adjusted under 35 U.S.C. 154(b) by 877 days.

(21) Appl. No.: 11/671,141

(22) Filed: Feb. 5, 2007

(65) Prior Publication Data

US 2008/0189500 A1 Aug. 7, 2008

(51) Int. Cl.
*G06F 12/14* (2006.01)
*G06F 21/02* (2006.01)
*G06F 21/00* (2006.01)
*G06F 13/00* (2006.01)

(52) U.S. Cl. ........ 713/193; 713/171; 713/189; 713/190; 713/194; 726/26; 726/27; 726/34; 711/100; 711/163; 711/164

(58) Field of Classification Search .................. None
See application file for complete search history.

(56) References Cited

U.S. PATENT DOCUMENTS

| | | | | |
|---|---|---|---|---|
| 6,934,389 B2 * | 8/2005 | Strasser et al. | ................ | 380/201 |
| 7,107,044 B1 * | 9/2006 | Zaidi et al. | ................ | 455/412.1 |
| 7,623,894 B2 * | 11/2009 | Vaglica et al. | ................ | 455/557 |
| 7,882,344 B2 * | 2/2011 | Byun et al. | ................ | 713/2 |
| 2003/0200405 A1 * | 10/2003 | Willman et al. | ................ | 711/163 |
| 2004/0024955 A1 * | 2/2004 | Patel | ................ | 711/100 |
| 2005/0097341 A1 * | 5/2005 | Francis et al. | ................ | 713/189 |
| 2005/0132186 A1 * | 6/2005 | Khan et al. | ................ | 713/165 |
| 2006/0015749 A1 * | 1/2006 | Mittal | ................ | 713/190 |
| 2006/0129848 A1 * | 6/2006 | Paksoy et al. | ................ | 713/193 |
| 2006/0288209 A1 * | 12/2006 | Vogler | ................ | 713/168 |
| 2007/0077915 A1 * | 4/2007 | Black et al. | ................ | 455/411 |
| 2009/0282268 A1 * | 11/2009 | Durham et al. | ................ | 713/193 |

* cited by examiner

*Primary Examiner* — Matthew Henning
*Assistant Examiner* — Alexander Lagor
(74) *Attorney, Agent, or Firm* — Dickstein Shapiro LLP

(57) ABSTRACT

Processor arrangement having a first processor, a second processor, and at least one memory configured to be shared by the first processor and the second processor. The second processor has a memory interface configured to provide access to the at least one memory, and a processor communication interface configured to provide a memory access service to the first processor. The first processor has a processor communication interface configured to use the memory access service from the second processor. The first processor and the second processor use at least one cryptographic mechanism in the context of the memory access service.

41 Claims, 8 Drawing Sheets

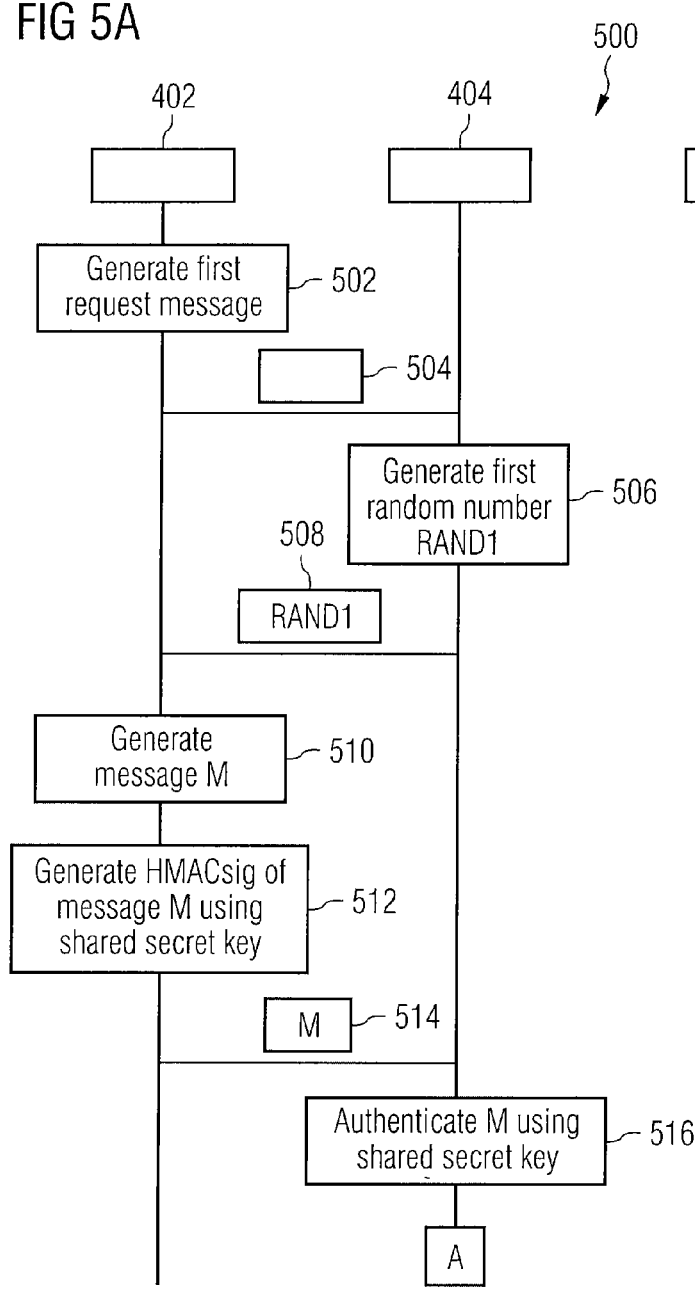

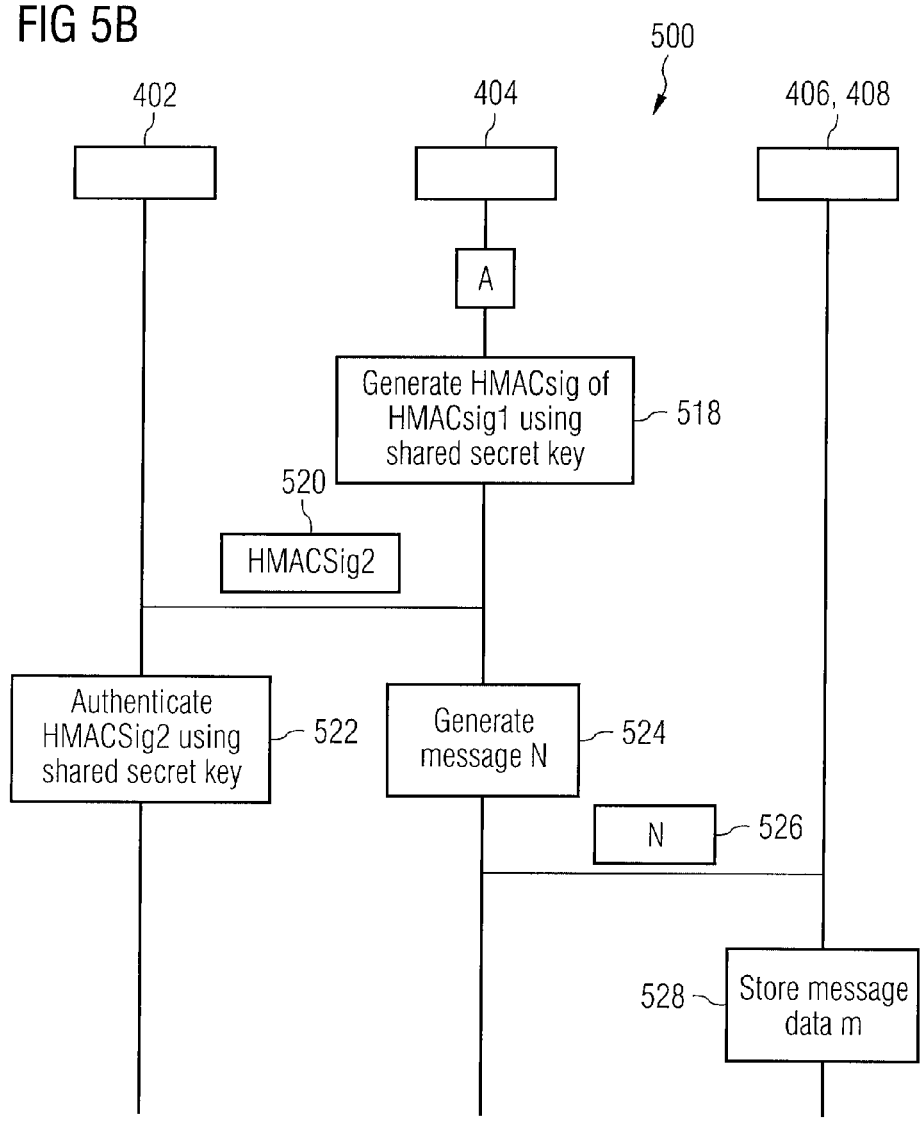

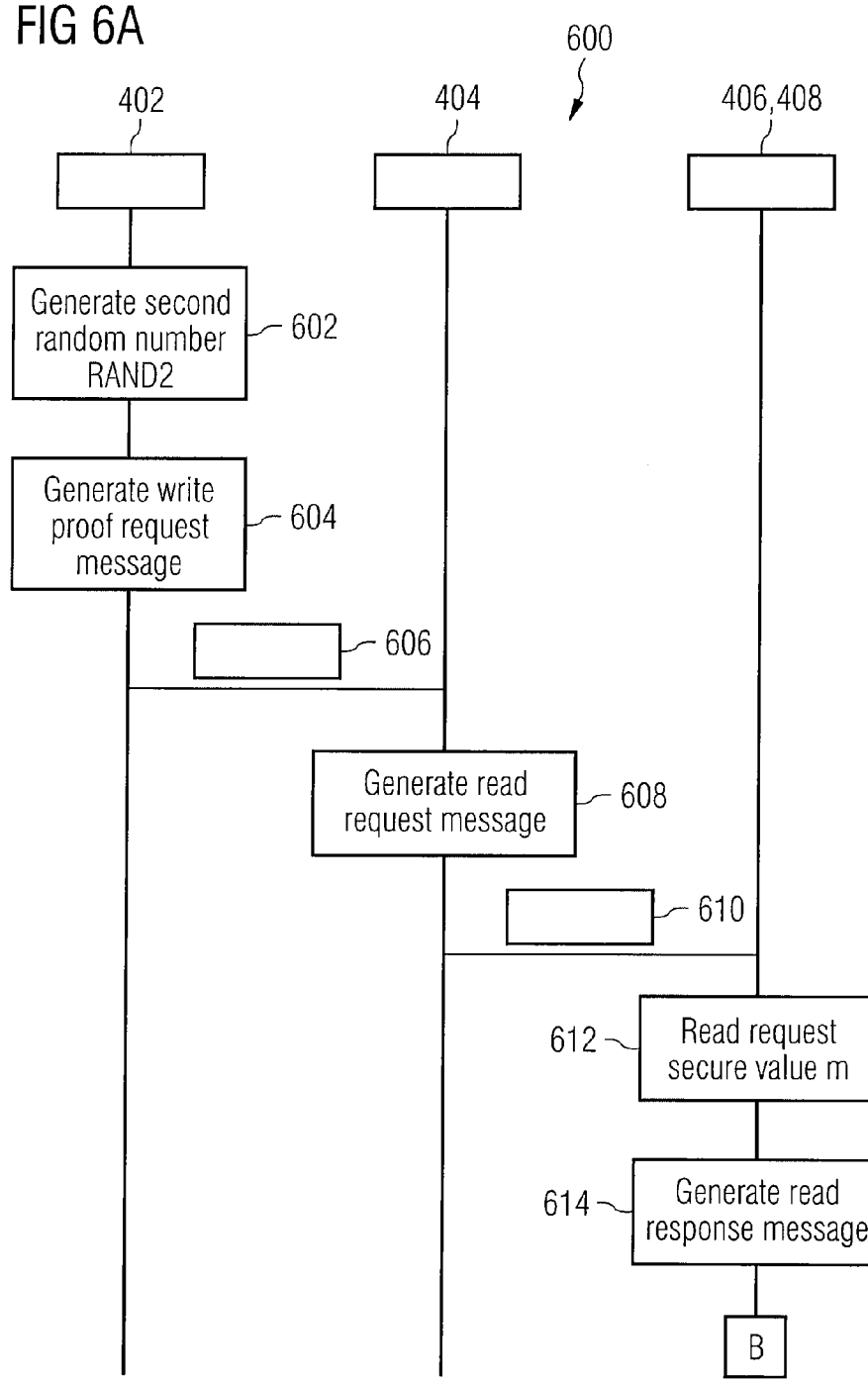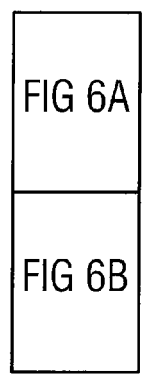

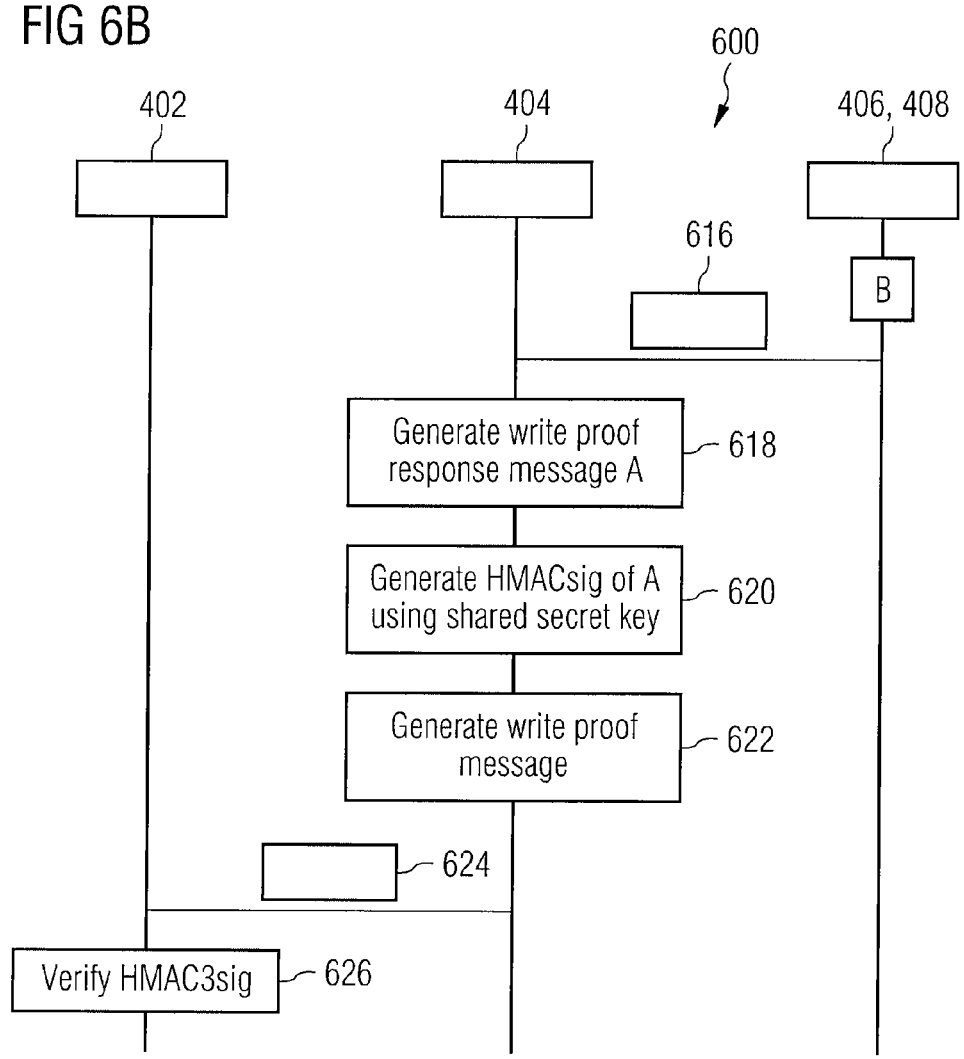

SECURE PROCESSOR ARRANGEMENT HAVING SHARED MEMORY

BACKGROUND

The present invention relates generally to processor arrangements, a processor, and a method of operating a processor arrangement.

It is desirable to provide a system having a plurality of processors and a memory shared by the plurality of processors.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 5A and 5B show a message flow diagram in accordance with an embodiment of the invention; and FIGS. 6A and 6B show another message flow diagram in accordance with an embodiment of the invention;

DESCRIPTION

Figure 1:
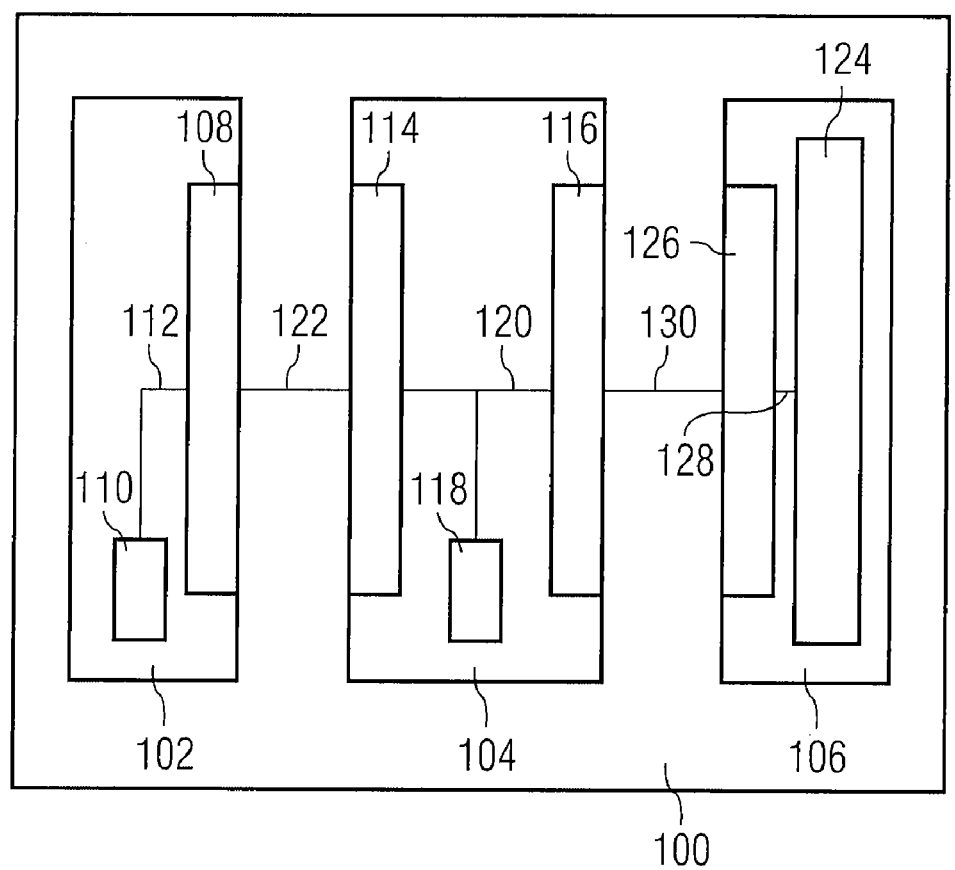
FIG. 1 shows a processor arrangement in accordance with an embodiment of the invention.

In accordance with an exemplary embodiment of the invention, a system is provided, where two components (in the following also referred to as processors) containing processor units share the use of an external memory. The memory is shared in order to reduce component count and hence the cost of the resulting system. A solution is desired which allows this cost saving solution without reducing the over-all security provided by the system.

In one embodiment of the invention, as will be explained in more detail below, the system is part of a mobile phone platform. One component of the mobile phone platform, the application processor; is directly connected to the external memory. In one embodiment of the invention, there are two types of memory to consider. These are a volatile memory (Dynamic Random Access Memory (DRAM), for example), and non-volatile memory. In one embodiment of the invention, the second component is a modem controller, and this accesses the memory through the application processor.

In the context of this description, a "volatile memory" may be understood as a memory storing data, the data being refreshed during a power supply voltage of the memory system being active, in other words, in a state of the memory system, in which it is provided with power supply voltage. In contrast thereto, a "non-volatile memory" may be understood as a memory storing data, wherein the stored data is/are not refreshed during the power supply voltage of the memory system being active.

However, a "non-volatile memory" in the context of this description includes a memory, the stored data of which may be refreshed after an interruption of the external power supply. As an example, the stored data may be refreshed during a boot process of the memory system after the memory system had been switched off or had been transferred to an energy deactivation mode for saving energy, in which mode at least some or most of the memory system components are deactivated. Furthermore, the stored data may be refreshed on a regular timely basis, but not, as with a "volatile memory" every few picoseconds or nanoseconds or milliseconds, but rather in a range of hours, days, weeks or months.

In terms of security, the computer program code running on the modem controller is usually considered to be secure, and to be part of a closed system. The application processor is usually running a complex operating system (OS), and also possibly untrustworthy applications downloaded by the end-user. The application processor in an embodiment of the invention usually does have a secure mode, which may be a secure hardware thread, could be supported by operating system (OS) virtualization, or even support a second processor for handling secure operations.

The above-mentioned two types of memory are usually handled differently. The volatile memory (e.g. DRAM) access is set up by the secure part of the application processor, so that non-secure applications running on the application processor do not have access to the DRAM memory used by the modem controller. The modem controller usually has direct access to the DRAM interface via the application processor.

The modem controller may communicate with the application processor via a shared memory region, but the access rights in this region do not differentiate between the secure engine and the non-secure engine of the application processor.

Non-volatile memory write accesses are more complex to handle, and this is especially the case for a NAND flash memory. The file systems are also more complex in a NAND flash memory than when directly using DRAM. For this reason, write accesses are usually carried out by the application processor as a service for the modem controller.

In one embodiment of the invention, the non-volatile memory (e.g. a non-volatile RAM (NVRAM) such as a Flash memory, e.g. a floating gate memory or a charge trapping memory) is split into one or more secure sections and one or more non-secure sections.

When the modem controller wishes to carry out a secure write operation, it communicates with the application processor, but needs to be sure that it is communicating with the secure engine of the application processor (e.g., with the application processor operating in a secure mode), so that it can be sure that its secure write access will really be carried out, or requires proof that the write operation has actually been carried out.

In order to achieve this, conventionally, the following approaches have been used:

i) Ignoring security issues.

ii) Attaching extra memory components to the modem controller, which then adds cost to the system.

iii) Moving all security features to the application processor. However, this is not always possible, as sometimes the security features are embedded in the modem controller system software, and this is the most secure place to achieve the above-described effect.

In one embodiment of the invention, the above-effect is achieved by adding a minimum number of security features to the modem controller (in general, a first processor, which may be a programmable processor (e.g. a programmable microprocessor), e.g. a trusted processor), so that a secure channel can be set up between it and the secure part of the application processor (in general, a second processor, which may a programmable processor (e.g. a programmable microprocessor) and which may be operable in a secure mode (e.g. representing the secure part) and in a non-secure mode).

FIG. 1 shows a processor arrangement 100 in accordance with an embodiment of the invention. In accordance with an embodiment of the invention, the processor arrangement 100 and the processor arrangements described in alternative embodiments of the invention, may be part of a mobile communication device platform, e.g. part of a mobile phone platform.

The processor arrangement 100 may have a first processor 102, a second processor 104 and at least one memory 106 (volatile and/or non-volatile) being shared by the first processor 102 and the second processor 104.

In one embodiment of the invention, the first processor 102 includes a processor communication interface 108 using the memory access service from the second processor 104. Furthermore, in one embodiment of the invention, the first processor 102 includes a cryptography unit 110 providing one or more cryptographic mechanisms, e.g. in the context of a memory access service. The one or more cryptographic mechanisms will be described in more detail below. The cryptography unit 110 and the processor communication interface 108 are connected with each other via a processor-internal connection 112.

In one embodiment of the invention, a memory access service may be understood as being a write access service providing a write access to write one data item or a plurality of data items to the memory 106 or as being a read access service providing a read access to read one data item or a plurality of data items from the memory 106.

In one embodiment of the invention, the second processor 104 includes a processor communication interface 114 providing a memory access service to the first processor 102. The second processor 104 further includes a memory interface 116 providing access to the at least one memory 106. Furthermore, the second processor 104 includes a cryptography unit 118 providing one or more cryptographic mechanisms, e.g. in the context of a memory access service. The one or more cryptographic mechanisms will be described in more detail below. The cryptography unit 118, the processor communication interface 114 and the memory interface 116 are connected with each other via a processor-internal connection 120.

Within the context of a memory access service, the first processor 102 and/or the second processor 104 use at least one cryptographic mechanism, e.g. provided by using the cryptography units 110, 118.

The first processor 102 and the second processor 104 are connected with each other via their respective processor communication interfaces 108, 114 and a processor-processor connection 122.

In one embodiment of the invention, the memory 106 includes a memory area 124, e.g. a memory array, having a plurality of (e.g. thousands or millions) memory cells, e.g. volatile memory cells or non-volatile memory cells. Furthermore, the memory 106 includes a memory controller (not shown) for controlling memory access operations (e.g. a write operation to write one or a plurality of data items into the memory cells of the memory area 124 or a read operation to read one or a plurality of data items from the memory cells of the memory area 124) and a memory interface 126 (connected to the memory area 124 via a memory-internal connection 128) providing a memory-external data/control input/output interface to the second processor 104.

The memory 106 and the second processor 104 are connected with each other via their respective memory interfaces 116, 126 and a memory-processor connection 130.

As will be described in more detail below, the memory access (e.g. read access or write access) from the first processor 102 is carried out (at least also) via the second processor 104.

Figure 2:
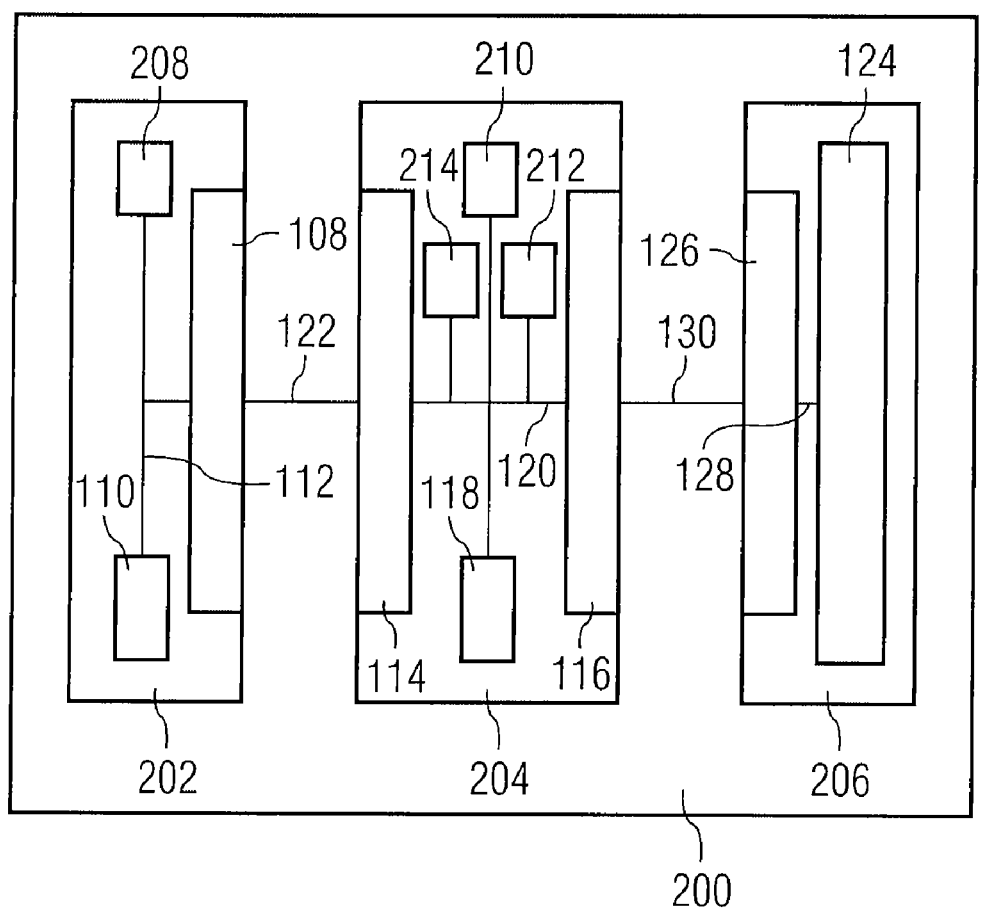
FIG. 2 shows a processor arrangement in accordance with another embodiment of the invention.

FIG. 2 shows a processor arrangement 200 in accordance with another embodiment of the invention. The elements being similar in the processor arrangement 200 in accordance with the embodiment shown in FIG. 2 compared with the respective elements of the processor arrangement 100 in accordance with the embodiment shown in FIG. 1 are designated with the identical reference numbers and will not be described again in detail.

The processor arrangement 200 includes a first processor 202 (in this embodiment of the invention a trusted processor such as a modem controller, for example), a second processor 204 (in this embodiment of the invention a processor being operable in a trusted mode and in a non-trusted mode) and a memory 206.

The first processor 202 includes the processor communication interface 108 and the cryptography unit 110 providing one or more cryptographic mechanisms, e.g. in the context of a memory access service. Furthermore, the first processor 202 includes a first processor secret key 208 being assigned to the first processor 202. The cryptography unit 110 and the processor communication interface 108 are connected with each other via the processor-internal connection 112.

In one embodiment of the invention, the second processor 204 includes the processor communication interface 114, the memory interface 116 providing access to the at least one memory 106, and the cryptography unit 118 providing one or more cryptographic mechanisms, e.g. in the context of a memory access service. Furthermore, the second processor 204 includes a second processor secret key 210 being assigned to the second processor 204. The second processor 204 is configured to operate in a trusted mode (symbolized in FIG. 2 by means of a trusted engine 212) or in a non-trusted mode (symbolized in FIG. 2 by means of a non-trusted engine 214). The second processor 204 can be configured to provide a split-boot, during which it may be (e.g. cryptographically assisted) decided as to whether it boots in a cryptographically secure manner (e.g. then being operable in a trusted mode) or in a cryptographically insecure manner (e.g. then being operable in a non-trusted mode). The cryptography unit 118, the processor communication interface 114 and the memory interface 116 are connected with each other via a processor-internal connection 120.

The at least one memory 206 is shared by the first processor 202 and the second processor 204 and includes the memory area 124 and the memory interface 126 being connected with each other via the memory-internal connection 128. The memory 206 and the second processor 204 are connected with each other via their respective memory interfaces 116, 126 and the memory-processor connection 130.

Figure 3:
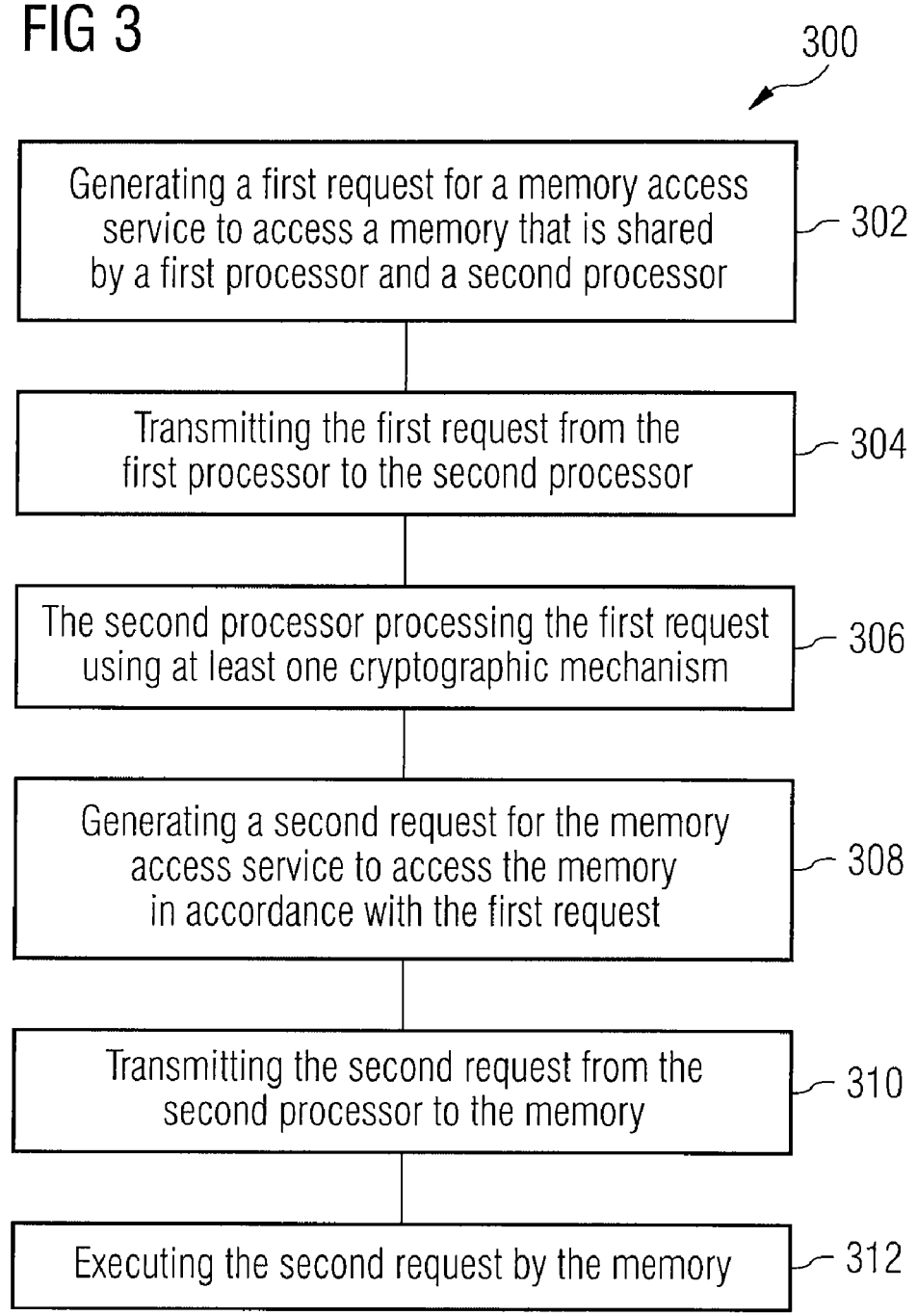
FIG. 3 shows a flow diagram illustrating a method of operating a processor arrangement in accordance with an embodiment of the invention.

FIG. 3 shows a flow diagram 300 illustrating a method of operating a processor arrangement in accordance with an embodiment of the invention.

At 302, a first request for a memory access service to access a memory that is shared by a first processor and a second processor is generated.

At 304, the first request is transmitted from the first processor to the second processor.

Furthermore, at 306, the second processor processes the first request using at least one cryptographic mechanism.

At 308, a second request for the memory access service to access the memory in accordance with the first request is generated, e.g. by the second processor.

At 310, the second request is transmitted from the second processor to the memory.

At 312, the second request is executed by the memory. In case that the request for a memory access service is a write request, the data item(s) to be written into the memory cells of the memory may be included in the first request (and correspondingly in the second request) or in one or a plurality of separate write access messages and is (are) transmitted to the memory to be stored therein. In case that the request for a memory access service is a read request, the data item(s) to be read from the memory cells of the memory may be included in a first response message being transmitted from the memory to the second processor (and correspondingly in a second response message being transmitted from the second processor to the first processor).

Figure 4:
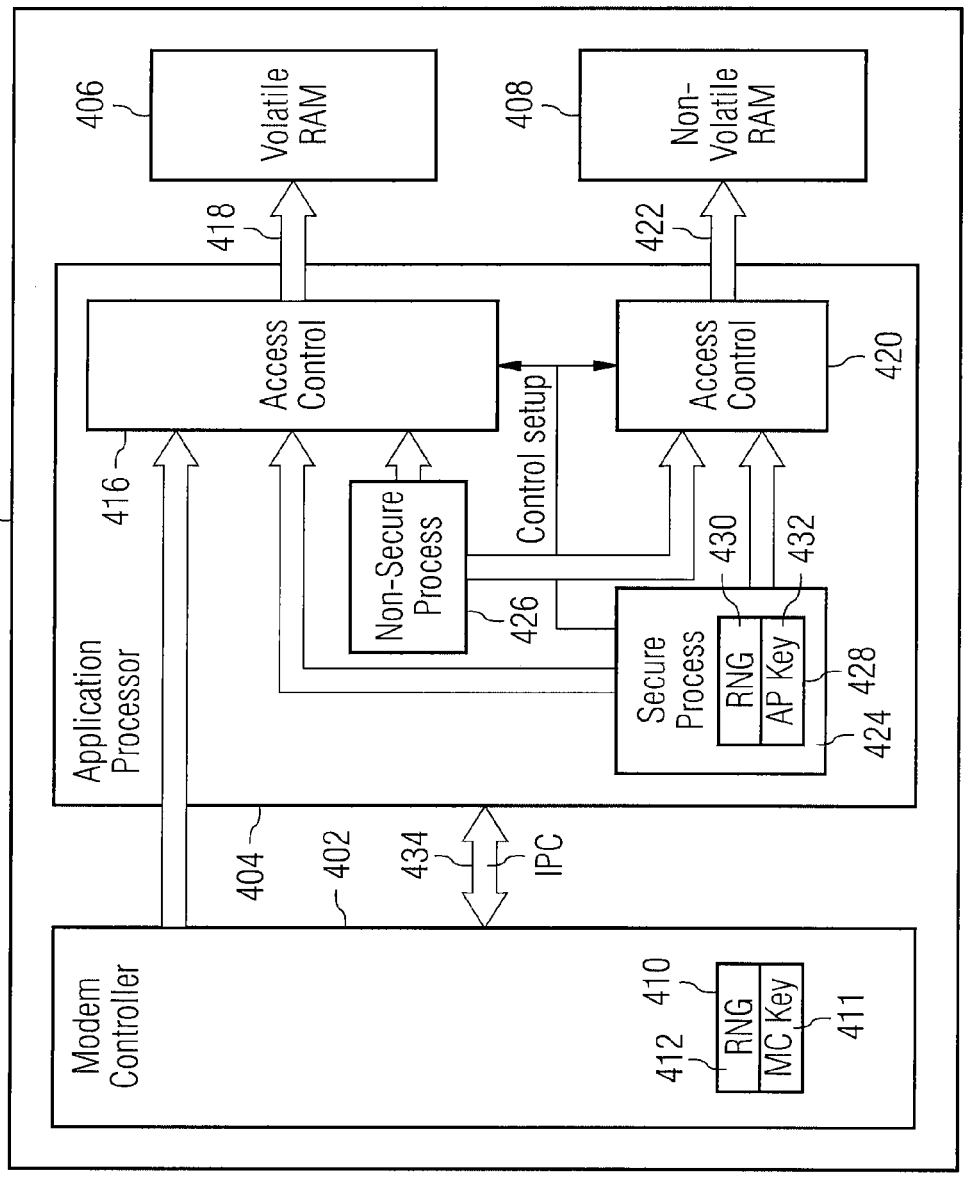
FIG. 4 shows a processor arrangement in accordance with yet another embodiment of the invention.

FIG. 4 shows a processor arrangement 400 in accordance with yet another embodiment of the invention. It should be mentioned that the particular implementations of the embodiment(s) described below refer analogously to particular embodiments of the processor arrangement 100, 200 described above.

The processor arrangement 400 includes a first processor 402, e.g. a modem controller, a second processor 404, e.g an application processor, a volatile memory 406 (e.g. a volatile random access memory (volatile RAM)) and a non-volatile memory 408 (e.g. a non-volatile random access memory (NVRAM)).

The first processor 402 includes a cryptography unit 410 having a random number generator 412 and a first processor secret key 414. Thus, in one embodiment of the invention, a secret key (e.g. the first processor secret key 414) is added to the first processor 402 (e.g. the modem controller). In one embodiment of the invention, the first processor optionally further includes a central processing unit (CPU) and one or a plurality of processor-internal memories.

The second processor 404 runs (and thus has installed) an operating system (OS) such as e.g. a Windows operating system or a Unix-based operating system, or any other type of operating system (e.g. a monolithic operating system or a micro-kernel operating system), and also possibly untrustworthy applications downloaded by the end-user. The application processor in this embodiment of the invention usually does have a secure mode, which may be a secure hardware thread, could be supported by operating system (OS) virtualization, or even support a second processor for handling secure operations.

The second processor 404 includes a first access control unit 416 (including a first memory interface (symbolized by means of a first arrow 418)) providing a memory access service (write access and/or read access) with regard to a memory access to the volatile memory 406 and a second access control unit 420 (including a second memory interface (symbolized by means of a second arrow 422)) providing a memory access service (write access and/or read access) with regard to a memory access to the non-volatile memory 408.

In one embodiment of the invention, the second processor 404 includes a secure process unit 424 (e.g. a secure engine) representing the operation of the second processor 404 in a secure (e.g. trusted) operation mode, and a non-secure process unit 426 (e.g. a non-secure engine) representing the operation of the second processor 404 in a non-secure (e.g. non-trusted) operation mode. The secure process unit 424 and the non-secure process unit 426 may be separate configurable hardware units. However, in another embodiment of the invention, the secure process unit 424 and the non-secure process unit 426 are functional units being implemented by one or a plurality of corresponding computer program elements providing the respective desired functionality. In this embodiment of the invention, the secure process unit 424 and the non-secure process unit 426 are implemented using the central processing unit (CPU) (not shown) of the second processor 404.

The secure process unit 424 includes a cryptography unit 428 having a random number generator 430 and a second processor secret key 432. Thus, in one embodiment of the invention, a secret key (e.g. the second processor secret key 432) is added to the second processor 404 (e.g. the application processor).

Descriptively, in one embodiment of the invention, the secure process on the application processor thus also contains a secret key.

In one embodiment of the invention, the first processor 402 and the second processor 404 are connected with each other by means of a inter-processor communication connection 434.

In one embodiment of the invention, these two keys (e.g. the first processor secret key 414 and the second processor secret key 432) are written during the manufacturing process of a mobile phone (in alternative embodiments of the invention, of any type of communication device such as a personal digital assistant (PDA), laptop, etc.), and cannot be changed afterwards. In an alternative embodiment of the invention, the two keys (e.g. the first processor secret key 414 and the second processor secret key 432) may be generated using any suitable and as such conventional key generation protocol.

These cryptographic keys could be the same in which case they could be used as a shared symmetric key for confidential communication between the first processor 402 (e.g. the modem controller) and the second processor 404 (e.g. application processor). They could also be different, but each processor 402, 404 could use its own cryptographic key to confidentially store a common shared key in a non-volatile RAM. In one embodiment of the invention, this common cryptographic key is generated and stored during the manufacturing process of the processor arrangement (e.g. a mobile phone).

Depending on the desired one or plurality of cryptographic mechanisms during the provision of a memory access service (which may include one or a plurality of memory access operations), the cryptography units 410, 428 are configured to provide at least one cryptographic mechanism of a group of cryptographic mechanisms consisting of:
  authentication;
  encryption;
  digital signature;
  cryptographic hash value generation, etc.

In general, the cryptography units 410, 428 may be configured to provide symmetric cryptographic algorithms using shared secret key(s) and/or asymmetric cryptographic algorithms (e.g. using one or a plurality of cryptographic key pairs (each cryptographic key pair including a secret key and a public key).

If confidentiality is an important concern, and the data to be stored belongs to the first processor 402 (e.g. the modem controller), then the write access can be carried out by the non-secure process of the second processor 404 (e.g. the application processor). In this case, the first processor 402 (e.g. the modem controller) can use a cryptographic key, which the second processor 404 (e.g. the application processor) does not know, for a secure read operation and a secure write operation.

If the data concerned should be further processed by the secure engine of the second processor 404 (e.g. the application processor), then a shared key is required. Further, if the first processor 402 (e.g. the modem controller) needs confirmation that a particular piece of data has been received by the secure process of the second processor 404 (e.g. the application processor), then this can be solved in accordance with an embodiment of the invention in the following manner.

To begin with, an embodiment is described in which no confidentiality is required (see message flow diagram 500 in FIG. 5A and FIG. 5B):

The first processor 402 (e.g. the modem controller) requests to write some secure data to the second processor 404 (e.g. the application processor). To do this, at 502, the first processor 402 (e.g. the modem controller) generates a first request message 504 and transmits it to the second processor 404.

After having received the first request message 504, the second processor 404 (e.g. the application processor) at 506 generates a first random value (RAND1) (e.g. using the random number generator 430) and returns the first random value (RAND1) in a first random number message 508 including the first random value (RAND1) to the first processor 402 (e.g. the modem controller).

After having received the first random number message 508, the first processor 402 determines the first random value (RAND1) and stores it in a processor-internal memory.

At 510, a message data (m) is concatenated with the first random value (RAND1) by the first processor 402 (e.g. the modem controller) to make (in other words generate) a message M, and a hash message authentication code (HMAC) signature (HMACsig) of the message M is then generated by the first processor 402 (e.g. the modem controller) at 512. The shared key Ksh (e.g. the first processor secret key 414) is used in generating the HMACsig. In one embodiment of the invention, the MD2 algorithm or the MD5 algorithm (which is then provided by the cryptography unit 410 of the first processor 402) may be used to generate the HMACsig (also referred to as the first HMAC signature HMACsig1) of the message M. In an alternative embodiment of the invention, any other hash message authentication code (HMAC) signature algorithm may be used.

The message M thus is a concatenation of the message data (m) and the first random value (RAND1):

$$M = m | RAND1.$$

The hash message authentication code (HMAC) signature is formed according to:

$$HMACsig1 = HMAC(Ksh, M).$$

The message M and the hash message authentication code (HMAC) signature HMACsig1 are sent to the second processor 404 (e.g. the application processor) by the first processor 402 (e.g. the modem controller) in a first data message 514.

Because the secure process unit 424 (e.g. the secure engine) of the second processor 404 (e.g. the application processor) is in possession of the shared key, it can authenticate the received first data message 514, which it does at 516 after having received the first data message 514.

The first random value RAND1 is used to prevent replay attacks which would allow an old message to be re-sent (replay attack).

As shown in FIG. 5B, at 518, the secure process unit 424 (e.g. the secure engine) of the second processor 404 (e.g. the application processor) acknowledges the receipt of the first data message 514 and therewith of the message data (m) to be stored in one of the memories 406, 408 for example by making (in other words generating) a further HMAC signature of the received first HMAC signature HMACsig1 (also referred to as second HMAC signature HMACsig2 in the following) using the shared secret key Ksh (e.g. the second processor secret key 432):

$$HMACsig2 = HMAC(Ksh, HMACsig1).$$

The second HMAC signature HMACsig2 is then transmitted to the first processor 402 in an acknowledgment message 520.

After having received the acknowledgment message 520, at 522, it can then be authenticated by the first processor 402 (e.g. the modem controller), which then has confirmation that the message data (m) has been received by the secure process unit 424 (e.g. the secure engine) of the second processor 404 (e.g. the application processor).

Furthermore, at 524, the secure process unit 424 (e.g. the secure engine) of the second processor 404 (e.g. the application processor) generates a second data message N 526 which includes the message data (m) and transmits it to the respective memory (e.g. the volatile memory 406 or the non-volatile memory 408) the message data (m) should be stored in.

After having received the second data message N 526, at 528, the memory 406, 408 determines the message data (m) and stores it.

In an embodiment, in which confidentiality is required, the value m (e.g. the message data (m)) can also be encrypted with the shared secret key Ksh (e.g. the first processor secret key 414).

In this embodiment of the invention, the secure process unit 424 (e.g. the secure engine) of the second processor 404 (e.g. the application processor) now stores the value m (e.g. the message data (m)) securely.

FIG. 6A and FIG. 6B show a message flow diagram 600 illustrating an exemplary embodiment of the invention, in which a proof is provided that the write access service has fully been provided, in other words, that the write operation has occurred.

The simplest case would be that the first processor 402 (e.g. the modem controller) has absolute trust in the secure process unit 424 (e.g. the secure engine) of the second processor 404 (e.g. the application processor). In this case, the first processor 402 (e.g. the modem controller) takes the receipt of HMACsig2 also as proof that the message data (m) has been written into the desired memory 406, 408 (the information, where the message data (m) should be stored may be signalled to the second processor 404 in the first message M 514 or in a separate message (not shown)). In this case, the first processor 402 (e.g. the modem controller) could read the secure flash area via the secure process unit 424 (e.g. the secure engine) of the second processor 404 (e.g. the application processor).

In another embodiment of the invention illustrated in FIG. 6, the protocol is extended so that the first processor 402 (e.g. the modem controller) receives proof that the write operation has actually taken place.

Again, a protocol is provided which allows the first processor 402 (e.g. the modem controller) to be certain that it is communicating with the secure process unit 424 (e.g. the secure engine) of the second processor 404 (e.g. the application processor), and it should not be possible for an external attacker or insecure software (e.g. being installed) on the second processor 404 (e.g. the application processor) to spoof the response via a replay attack.

A protocol in accordance with one embodiment of the invention is as follows. However, it should be mentioned that any other type of protocol to provide the proof that the write operation actually has taken place may be used in an alternative embodiment of the invention.

Following the write operation, the first processor 402 (e.g. the modem controller) requests to read a secure value (m), and, at 602, generates a second random value RAND2 (e.g. using the random number generator 412 of the first processor 402. At 604, the first processor 402 (e.g. the modem controller) generates a write proof request message 606 (which includes the request to read the secure value (m) and the second random value RAND2) and sends it to the second processor 404 (e.g. the application processor).

After having received the write proof request message 606, the secure process unit 424 (e.g. the secure engine) of the second processor (e.g. the application processor) reads the value (m) from the memory 406, 408. This is done in that, at 608, the secure process unit 424 (e.g. the secure engine) of the second processor (e.g. the application processor) generates a read request message 610 (including the address of the secure value (m) to be read) and transmits the read request message 610 to the respective memory 406, 408.

After having received the read request message 610, at 612, the memory 406, 408 reads the requested secure value (m) from the memory area and, at 614, generates a read response message 616, which includes the read secure value (m). The memory 406, 408 then transmits the read response message 616 to the secure process unit 424 (e.g. the secure engine) of the second processor 404 (e.g. the application processor).

After having received the read response message 616, the secure process unit 424 (e.g. the secure engine) of the second processor 404 (e.g. the application processor) determines the secure value (m) from the read response message 616 and concatenates it with the second random value RAND2, thereby generating a write proof response message A at 618:

$$A = m | RAND2.$$

At 620, the secure process unit 424 (e.g. the secure engine) of the second processor 404 (e.g. the application processor) then generates a third signature value HMACsig3 over the write proof answer message A:

$$HMACsig3 = HMAC(Ksh, A).$$

The protocol can be completed in one of the following ways:

In accordance with one embodiment of the invention, as shown in FIG. 6B, at 622, the secure process unit 424 (e.g. the secure engine) of the second processor 404 (e.g. the application processor) generates a write proof message 624 (which includes the secure value (m) and the third signature value HMAC3sig) and transmits it to the first processor (e.g. the modem controller). Thus, descriptively, the second processor 404 delivers the secure value (m) and the third signature value HMACsig3 to the first processor 402 (e.g. the modem controller). The first processor 402 (e.g. the modem controller) uses the received delivered third signature value HMACsig3 to verify (at 626) that it is communicating with the secure process unit 424 (e.g. the secure engine) of the second processor 404 (e.g. the application processor), and to check that no corruption has taken place in the communication.

In an alternative embodiment of the invention (not shown in the figures), the secure process unit 424 (e.g. the secure engine) of the second processor 404 (e.g. the application processor) delivers the third signature value HMACsig3. The first processor 402 (e.g. the modem controller) reads the secure value (m) directly from memory 406, 408 on its own. The third signature value HMACsig3 can be used to check that the secure value (m) in memory 406, 408 is correct.

In a yet alternative embodiment of the invention (not shown in the figures), the first processor 402 (e.g. the modem controller) reads the secure value (m) and the third signature value HMACsig3 (which in this case would be stored in the memory 406, 408 by the second processor 404) directly from the memory 406, 408 on its own.

The use of the third signature value HMACsig3 (which may be generated using the second random value RAND2) in all of the options proves that the first processor 402 (e.g. the modem controller) is really communicating with the secure process unit 424 (e.g. the secure engine) of the second processor 404 (e.g. the application processor), and that the first processor 402 (e.g. the modem controller) is not being spoofed with a replay attack.

One effect of the two above-described alternative embodiments is that the first processor 402 (e.g. the modem controller) has to place less trust in whether the second processor's 404 (e.g. the application processor's) secure engine has actually written the data to memory (e.g. to the flash). In the embodiment shown in FIG. 6, if the secure process unit 424 (e.g. the secure engine) of the second processor 404 (e.g. the application processor) does not have direct access to the memory (e.g. to the flash), then the secure process unit 424 (e.g. the secure engine) of the second processor 404 (e.g. the application processor) could be fooled into believing that the non-secure software has carried out the memory (e.g. flash) access (man in the middle attack).

Some application processors may have extensive DRAM access protection, where separate memory regions exist for communication between the first processor 402 (e.g. the modem controller) and the secure process unit 424 (e.g. the secure engine) of the second processor 404 (e.g. the application processor).

The described methods are still useful to prevent physical attacks, where write accesses are prevented at inter-component level.

If the non-volatile memory 408 is a Flash memory and in particular a NAND Flash memory, then the read request should cause the second processor 404 (e.g. the application processor) to force a read from the NAND flash memory, and force a 'refresh' of the data in the volatile memory, e.g. the DRAM or SRAM, that is also provided in the NAND flash memory, if the first processor 402 (e.g. the modem controller) does not have direct access to the NAND Flash memory. If a NOR flash memory is being used as the non-volatile memory 408, then the first processor 402 (e.g. the modem controller) may be able to read directly from the NOR Flash (e.g. via the second processor 404 (e.g. the application processor) component).

If the secure process unit 424 (e.g. the secure engine) of the second processor 404 (e.g. the application processor) has direct access to the flash memory, then the non-secure process unit 426 (e.g. the non-secure engine) of the second processor 404 (e.g. the application processor) cannot feign the DRAM (or SRAM, for example) update, as it can only possibly have this data by reading the Flash memory. This then proves that the write operation to Flash memory has taken place. One remaining risk may exist. This would be if the non-secure software in the second processor 404 (e.g. in the application processor) then over-writes the values in the DRAM (or SRAM, for example) memory with a previous legal value. This can be avoided with a suitable Flash management system.

Further, in another embodiment of the invention, it is provided that the non-secure process unit 426 (e.g. the non-secure engine) of the second processor 404 (e.g. the application processor) does not write directly into the first processor's (e.g. the modem controller's) DRAM area (or SRAM area, for example), but in a reference area. This will be explained in more detail below.

In the following, the secure process unit 424 (e.g. the secure engine) of the second processor 404 (e.g. the application processor) and the Flash memory management in accordance with one embodiment of the invention will be described in more detail.

In order to ensure that a write operation by the secure process unit 424 (e.g. the secure engine) of the second processor 404 (e.g. the application processor) takes place, then the secure process unit 424 (e.g. the secure engine) of the second processor 404 (e.g. the application processor) needs direct access to the Flash memory. This may have some disadvantages. Flash file systems are usually rather complex, and a secure engine should be kept as simple as possible. One embodiment of the invention provides both, a direct access to the Flash memory and a rather simple secure engine of the second processor 404.

In one embodiment of the invention, the secure Flash memory 408 is split into two parts.

A first part contains the actual data to be stored. These would be the message data (m) in the description so far, for example.

A second part contains the signatures of the message data (m). These would be the first signature value HMACSig1 and a random number RANDx which is used to calculate the first signature value HMACSig1, for example.

The non-secure software is responsible for the first part of the secure Flash memory 408. The second part is a very small simple flash system, and is e.g. managed by the secure process unit 424 (e.g. the secure engine) of the second processor 404 (e.g. the application processor). Write control over the second part of the secure Flash memory 408 in this embodiment of the invention is enough to ensure integrity and authenticity of data stored in the first part of the Flash memory 408. If the secure process unit 424 (e.g. the secure engine) of the second processor 404 (e.g. the application processor) also has read access to the mirror of these values in the DRAM of the Flash memory 408, then over-writing of the mirror of these values by non-secure software can also be detected. The first processor 402 (e.g. the modem controller) could also request values to be checked for integrity at any time.

Another method of an alternative embodiment of the invention would be for the first processor 402 (e.g. the modem controller) to write the message data (m) into the DRAM (or SRAM, for example) 406, and request the secure process unit 424 (e.g. the secure engine) of the second processor 404 (e.g. the application processor) to store it in the Flash memory cells of the Flash memory 408. The DRAM (or SRAM, for example) 406 does then not need updating, and it would only be necessary to prove that the HMAC value has been stored in the Flash memory cells of the Flash memory 408. If the message data (m) has not been stored in Flash memory cells of the Flash memory 408, it will be detected later (at least after the next reset), as the HMAC value has been securely stored.

Some other system configurations where the basic principles of the above described embodiments are used are also possible, some of which will be described in more detail below.

In a single chip solution where the second processor (e.g. an application processor) and a first processor (e.g. communication controller such as e.g. a modem controller) share memory, it is possible that the first processor (e.g. the modem controller) enjoys a greater level of trust, but that the second controller (e.g. the application processor) controls the Flash File System. In this case, the first processor (e.g. the modem controller) could be considered to be the secure engine, and be given exclusive write access to a region of Flash memory where it can store the Hash (HMAC) values of secure data stored by the second controller (e.g. the application processor) in the main Flash memory area.

Another example of the basic concepts of embodiments of the invention is as follows.

A secure engine is built into a Flash memory component. The Hash values (and random numbers when required), are calculated by the secure engine in the Flash memory component. This implementation of an embodiment of the invention ensures that replay attacks at inter-chip level between processor and memory are not possible, and in some cases leads to simpler systems. In one embodiment of the invention, the first processor (e.g. the modem controller) could be ensured that it was communicating directly with the secure engine in the memory. The only possible attack left open in this embodiment is a Denial of Service attack, where an external attacker physically prevents the write operation, but this will at least always be detected with this solution.

In one embodiment of the invention, two components share a unified memory system, and one of the components (e.g. a first component A) accesses the memory via the other component (e.g. a second component B). Further, in one embodiment of the invention, the second component (e.g. B) has a secure engine and a non-secure engine.

The first component (e.g. A) and the second component (e.g. B) each have a non-volatile cryptographic key, which is either shared, or used to respectively protect a shared key (Ksh).

Any authentication handshake is used in order for the secure engine of the second component (e.g. B) to carry out secure data storage in non-volatile RAM for the first component (e.g. A). In one embodiment of the invention, the first component (e.g. A) primarily requires that the data which it sends to be written is stored in an unaltered form as requested.

In one embodiment of the invention, the handshake is based on the use of the shared secret key (e.g. Ksh) and two random number generators.

In one embodiment of the invention, the protocol is used so that the first component (e.g. A) has proof that it is communicating with the secure engine of the second component (e.g. B) when it sends some data to be stored in the shared memory.

In one embodiment of the invention, the protocol is extended to also allow the second component (e.g. B) to prove to the first component (e.g. A) that it has actually carried out the write operation.

In one embodiment of the invention, it is also considered to split up the flash file system so that the secure engine of the second component (e.g. B) only has to take care of storing the reference (HMAC) values. This keeps the software running in the secure engine of the second component (e.g. B) simpler and hence more secure.

In one embodiment of the invention, the embodiments are extended to a two processor single component solution where one processor is more secure than the other processor, but the less secure processor is responsible for the flash file system. In this case, the more secure processor also has access to a small part of the flash memory for storing the reference (HMAC) data secure date.

A further use of an embodiment of the invention is for the authentication process to take place between a component and a memory, so ruling out physical intervention between read operation and write operation to the memory.

In one embodiment of the invention, the first processor and the second processor are integrated in one common processor package within the processor arrangement.

In one embodiment of the invention, the first processor and the second processor are monolithically integrated in one substrate within the processor arrangement.

In one embodiment of the invention, a communication device such as e.g. a mobile radio communication device such as a mobile phone is provided having a processor arrangement in accordance with one of the above-described embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A processor arrangement, comprising:
   a first processor, wherein the first processor is a trusted processor;
   a first processor secret key being assigned to the first processor;
   a second processor configured to be operable in a trusted mode and in a non-trusted mode;
   a second processor secret key being assigned to the second processor;
   wherein the first processor secret key and the second processor secret key are equal and form a shared secret key;
   at least one memory configured to be shared by the first processor and the second processor;
   wherein the second processor comprises:
      a memory interface configured to provide access to the at least one memory; and
      a processor communication interface configured to provide a memory access service to the first processor,
   wherein the first processor comprises a processor communication interface configured to use the memory access service from the second processor,
   wherein the first processor and the second processor use at least one cryptographic mechanism in the context of the memory access service,
   wherein the first processor is configured to generate a random number and to provide the random number to the second processor,
   wherein the second processor is configured to generate a cryptographic hash value over a value previously stored in the memory and the random number using the shared secret key, and to store the generated cryptographic hash value in the memory;
   wherein the first processor is configured to directly read at least one of the value previously stored in the memory using the memory access service and the stored cryptographic hash value from the memory;
   wherein the second processor is configured to process data to be stored into the memory received from the first processor in a first data message using the at least one cryptographic mechanism and to generate a second data message including the data to be stored into the memory, in the context of the memory access service.

2. The processor arrangement of claim 1, wherein the first processor is a programmable processor.

3. The processor arrangement of claim 1, wherein the first processor is a communication processor.

4. The processor arrangement of claim 3, wherein the first processor is a modem controller.

5. The processor arrangement of claim 1, wherein the first processor secret key is unchangeable.

6. The processor arrangement of claim 1, wherein the second processor is a programmable processor.

7. The processor arrangement of claim 1, wherein the second processor is an application processor.

8. The processor arrangement of claim 1, wherein the second processor secret key is unchangeable.

9. The processor arrangement of claim 1, wherein the at least one memory comprises at least one volatile memory.

10. The processor arrangement of claim 9, wherein the at least one volatile memory comprises at least one random access memory.

11. The processor arrangement of claim 1, wherein the at least one memory comprises at least one non-volatile memory.

12. The processor arrangement of claim 11, wherein the at least one non-volatile memory comprises at least one Flash memory.

13. The processor arrangement of claim 1, wherein the first processor uses an authentication mechanism to authenticate itself to the second processor in a memory access service.

14. The processor arrangement of claim 1, wherein the first processor uses the shared secret key during the authentication.

15. The processor arrangement of claim 1, wherein the second processor operated in the trusted mode has access to the memory via the memory interface.

16. The processor arrangement of claim 1, wherein the memory comprises a first memory region and a second memory region, the first memory region stores data to be stored by the first processor or the second processor, and the second memory region stores cryptographic data used by the at least one cryptographic mechanism in the context of the memory access service.

17. The processor arrangement of claim 16, wherein the second memory region stores digital signatures of the data to be stored.

18. The processor arrangement of claim 1, wherein the at least one cryptographic mechanism comprises at least one cryptographic mechanism of a group of cryptographic mechanisms consisting of authentication, encryption, digital signature, and cryptographic hash value generation.

19. The processor arrangement of claim 1, wherein the first processor and the second processor are integrated in one common processor package.

20. The processor arrangement of claim 1, wherein the first processor and the second processor are monolithically integrated in one substrate.

21. A processor, comprising:
   a memory interface configured to provide access to at least one memory; and
   a processor communication interface configured to provide a memory access service to another processor;
   wherein the processor uses at least one cryptographic mechanism in the context of the memory access service for authenticating the other processor, and
   wherein the processor is operable in a trusted mode and in a non-trusted mode,
   wherein a processor secret key is assigned to the processor, which is equal to a processor secret key assigned to the other processor, forming a shared secret key; and wherein the processor is configured to generate a cryptographic hash value over a value previously stored in the memory and a random number provided by the other processor using the shared secret key, and to store the generated cryptographic hash value in the memory for being utilized by the other processor using the memory access service, wherein the processor is configured to process data to be stored into the memory received from the other processor in a first data message using the at least one cryptographic mechanism and to generate a second data message including the data to be stored into the memory, in the context of the memory access service.

22. The processor of claim 21,
wherein the processor is a programmable processor.
23. The processor of claim 21,
wherein the processor is an application processor.
24. The processor of claim 21,
wherein the processor secret key is unchangeable.
25. The processor of claim 21,
wherein the processor operated in the trusted mode has access to the memory via the memory interface.
26. The processor of claim 21,
wherein the processor is a memory controller.
27. The processor of claim 26,
wherein the memory controller is monolithically integrated in the same substrate together with a memory.
28. A processor arrangement, comprising:
a first processor, wherein the first processor is a trusted processor;
a first processor secret key assigned to the first processor;
a second processor configured to be operable in a trusted mode and in a non-trusted mode;
a second processor secret key assigned to the second processor; and
at least one memory configured to be shared by the first processor and the second processor,
wherein the second processor comprises:
a memory interface configured to provide access to the at least one memory; and
a processor communication interface configured to provide a memory access service to the first processor,
wherein the first processor comprises a processor communication interface configured to use the memory access service from the second processor,
wherein the first processor and the second processor are configured to use at least one cryptographic mechanism in the context of the memory access service, the first processor using the first processor secret key and the second processor using the second processor secret key when operated in the trusted mode,
wherein the second processor is configured to process data to be stored into the memory received from the first processor in a first data message using the at least one cryptographic mechanism and to generate a second data message including the data to be stored into the memory, in the context of the memory access service, and
wherein the memory comprises a first memory region and a second memory region, the first memory region stores data to be stored by the first processor or the second processor, and the second memory region stores cryptographic data used by the at least one cryptographic mechanism in the context of the memory access service.

29. The processor arrangement of claim 28,
wherein the first processor is a communication processor.
30. The processor arrangement of claim 29,
wherein the first processor is a modem controller.
31. The processor arrangement of claim 28,
wherein the first processor secret key is unchangeable.
32. The processor arrangement of claim 28,
wherein the second processor is an application processor.
33. The processor arrangement of claim 28,
wherein the second processor secret key is unchangeable.
34. The processor arrangement of claim 28,
wherein the first processor secret key and the second processor secret key are equal an form a shared secret key.
35. The processor arrangement of claim 28,
wherein the at least one cryptographic mechanism comprises at least one cryptographic mechanism of a group of cryptographic mechanisms consisting of authentication, encryption, digital signature, and cryptographic hash value generation.
36. A communication device, comprising:
a processor arrangement comprising:
a first processor, wherein the first processor is a trusted processor;
a first processor secret key being assigned to the first processor;
a second processor configured to be operable in a trusted mode and in a non-trusted mode;
a second processor secret key being assigned to the second processor;
wherein the first processor secret key and the second processor secret key are equal and form a shared secret key;
at least one memory configured to be shared by the first processor and the second processor,
wherein the second processor comprises:
a memory interface configured to provide access to the at least one memory; and
a processor communication interface configured to provide a memory access service to the first processor,
wherein the first processor comprises a processor communication interface configured to use the memory access service from the second processor,
wherein the first processor and the second processor use at least one cryptographic mechanism in the context of the memory access service,
wherein the first processor is configured to generate a random number and to provide the random number to the second processor,
wherein the second processor is configured to generate a cryptographic hash value over a value previously stored in the memory and the random number using the shared secret key, and to store the generated cryptographic hash value in the memory;
wherein the first processor is configured to directly read at least one of the value previously stored in the memory using the memory access service and the stored cryptographic hash value from the memory;
wherein the second processor is configured to process data to be stored into the memory received from the first processor in a first data message using the at least one cryptographic mechanism and to generate a second data message including the data to be stored into the memory, in the context of the memory access service.

37. A method of operating a processor arrangement, the method comprising:
generating a first request for a memory access service to access a memory that is shared by a first processor and a second processor;
transmitting the first request from the first processor to the second processor via a processor communication interface of the first processor;

the second processor processing data to be stored into the memory received via a processor communication interface of the second processor from the first processor in a first data message using at least one cryptographic mechanism;

generating a second data message including a second request for the memory access service to access the memory in accordance with the first request and the data to be stored into the memory;

transmitting the second data message from the second processor to the memory via a memory interface of the second processor; and executing the second request by the memory, wherein the first processor is a trusted processor and the second processor is operable in a trusted mode and in a non-trusted mode, wherein a first processor secret key is assigned to the first processor, wherein a second processor secret key is assigned to the second processor, wherein the first processor secret key and the second processor secret key are equal and form a shared secret key, wherein the first processor further generates a random number and provides the random number to the second processor;

wherein the second processor further generates a cryptographic hash value over a value previously stored in the memory and the random number using the shared secret key, and stores the generated cryptographic hash value in the memory;

wherein the first processor further directly reads at least one of the value previously stored in the memory using the memory access service and the stored cryptographic hash value from the memory.

38. The method of claim 37, wherein the first processor uses a first processor secret key that is assigned to the first processor in generating the first request.

39. The method of claim 37, wherein the at least one cryptographic mechanism comprises at least one cryptographic mechanism of a group of cryptographic mechanisms consisting of authentication, encryption, digital signature, and cryptographic hash value generation.

40. A processor arrangement, comprising:

a first processor, wherein the first processor is a trusted processor;

a second processor configured to be operable in a trusted mode and in a non-trusted mode; and at least one memory configured to be shared by the first processor and the second processor;

wherein the second processor comprises:
  a memory interface configured to provide access to the at least one memory; and
  a processor communication interface configured to provide a memory access service to the first processor, wherein the first processor comprises a processor communication interface configured to use the memory access service from the second processor, and wherein the first processor and the second processor use at least one cryptographic mechanism in the context of the memory access service;

wherein the second processor is configured to process data to be stored into the memory received from the first processor in a first data message using the at least one cryptographic mechanism and to generate a second data message including the data to be stored into the memory, in the context of the memory access service;

wherein the memory comprises a first memory region and a second memory region, the first memory region stores data to be stored by the first processor or the second processor, and the second memory region only stores cryptographic data stored by control of a secure processor or a processor when in a trusted mode.

41. A processor arrangement, comprising:

a first processor, wherein the first processor is a trusted processor;

a first processor secret key being assigned to the first processor;

a second processor configured to be operable in a trusted mode and in a non-trusted mode;

a second processor secret key being assigned to the second processor;

wherein the first processor secret key and the second processor secret key are equal and form a shared secret key;

at least one memory configured to be shared by the first processor and the second processor;

wherein the second processor comprises:
  a memory interface configured to provide access to the at least one memory; and
  a processor communication interface configured to provide a memory access service to the first processor, wherein the first processor comprises a processor communication interface configured to use the memory access service from the second processor, wherein the first processor and the second processor use at least one cryptographic mechanism in the context of the memory access service, wherein the first processor is configured to generate a random number and to provide the random number to the second processor, wherein the second processor is configured to generate a cryptographic hash value over a value previously stored in the memory and the random number using the shared secret key, and to store the generated cryptographic hash value in the memory;

wherein the first processor is configured to directly read at least one of the value previously stored in the memory using the memory access service and the stored cryptographic hash value from the memory;

wherein the second processor is configured to process a secure value read from the memory and transmitted in a read response message from the memory and to generate a write proof message including the secure value to be transmitted to the first processor using the at least one cryptographic mechanism, in the context of the memory access service.

* * * * *